June 19, 1945. H. A. GOLLMAR ET AL 2,378,403
CYCLIC PROCESS FOR PRODUCING ALKALI-METAL FERROCYANIDES
Filed Aug. 11, 1941
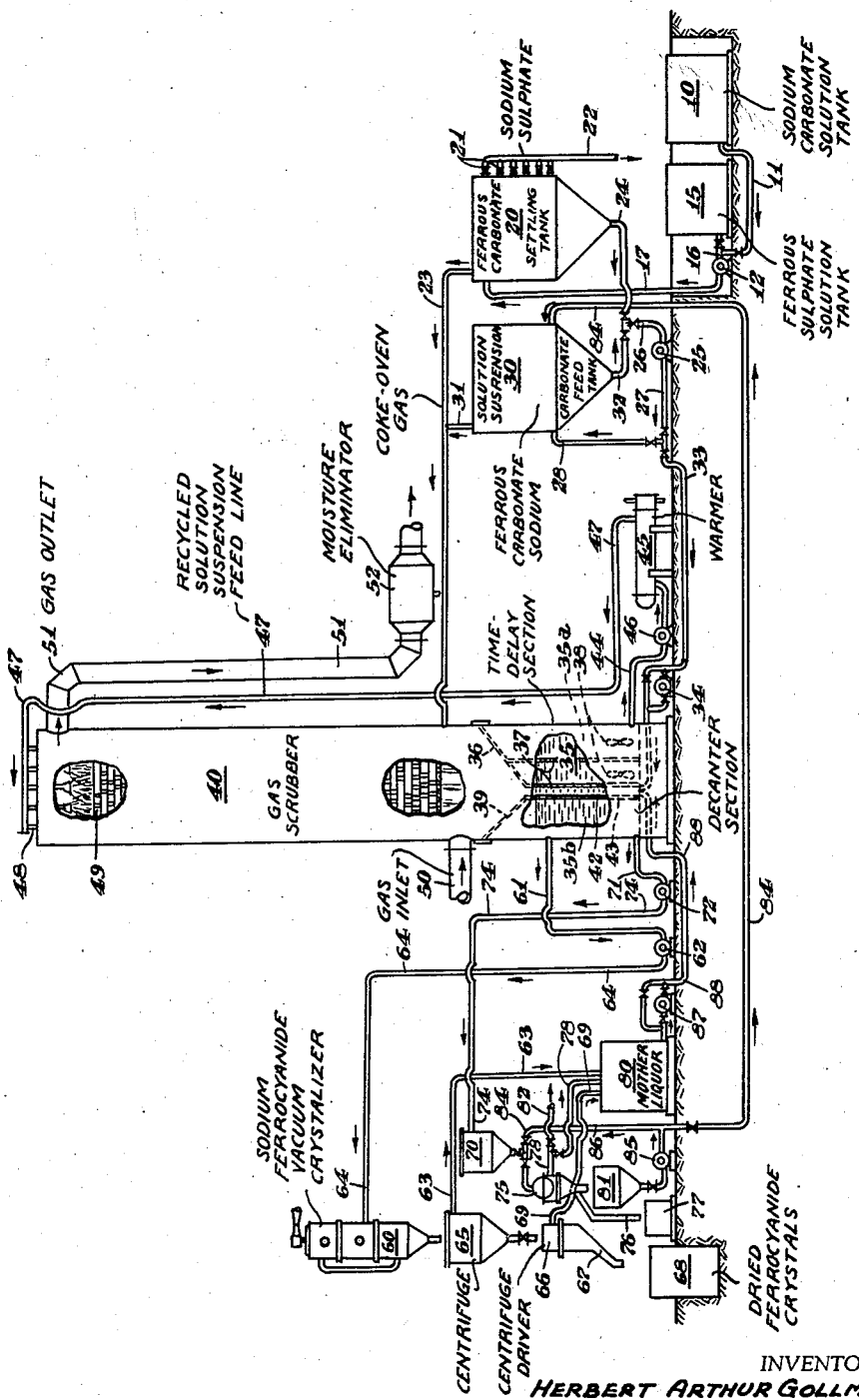
INVENTORS.
HERBERT ARTHUR GOLLMAR &
HOWARD JACKSON MEREDITH.
BY
Henry Love Clarke
their atty

UNITED STATES PATENT OFFICE 2,378,403

CYCLIC PROCESS FOR PRODUCING ALKALI-METAL FERROCYANIDES

Herbert Arthur Gollmar, Caldwell, N. J., and Howard Jackson Meredith, New York, N. Y., assignors, by mesne assignments, to Koppers Company, Inc., a corporation of Delaware Application August 11, 1941, Serial No. 406,348

5 Claims. (Cl. 23—76)

The present invention relates to the removal of cyanogen compounds from gases evolved by the destructive distillation of solid fuels and especially from coke-oven gas, and to the direct recovery of said cyanogen compounds as refined alkali-metal ferrocyanide.

An object of the present invention is the provision of a novel cyclic process comprising method and means whereby with relatively weakly alkaline solutions a highly efficient removal of cyanogen, and the like, from gases produced by carbonization of fuels can be effected and the same be continuously converted into water-soluble alkali-metal ferrocyanide, and whereby the latter can be recovered from said solutions in substantially pure form in a simple crystallization step and without substantial loss as insoluble cyanides, and whether or not the said gases are free of or contain their normal content of ammonia.

The invention has for further objects such other advantages or results as may be found to obtain in the processes or apparatus hereinafter described or claimed.

Hydrogen cyanide and cyanogen occurring in coke-oven gas are usually referred to in the industry collectively as cyanogen, of which the most is present as hydrogen cyanide, it being approximately 0.10 to 0.20 per cent by volume of gas evolved during the high-temperature carbonization of coal. The corrosiveness of hydrogen cyanide in the gas to the metals commonly used in fuel-gas distribution systems and the manifold commercial utility of cyanogen-bearing compounds make desirable the recovery of said cyanogen in the form of one of its useful compounds. The basic chemical reactions of the cyanogen-recovery method of the present invention are well known to the art and when proceeding in the presence of gas containing hydrogen sulphide comprise the following empirical equations: an absorption reaction,

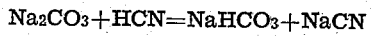

and a conversion reaction,

both of which are included in a summarizing equation,

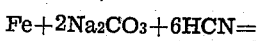

The present invention employs the above well-known reactions and accomplishes production of refined alkali-metal ferrocyanide in crystalline form in a cyclic process with highly efficient recovery of cyanogen from the gas and without the interfering formation of insoluble complex cyanides and the losses incident to their formation, the recovered crystals being without substantial contamination with the employed alkali carbonates or with associated compounds simultaneously formed in carrying out the reactions.

Briefly stated, the present invention provides a continuously operative cyclic process that essentially comprises countercurrently scrubbing warm, cyanogen-bearing gas with an aqueous medium, that is preferably above the gas's dew-point, containing in suspension an iron compound and in solution an alkalinity-producing non-volatile alkali-metal compound and also alkali-metal ferrocyanide previously formed in the operation of the process. During the said scrubbing step the cyanogen compounds are absorbed and, by their reaction with the suspended iron, are fixed as water-soluble alkali-metal ferrocyanide. Thereafter the latter is continuously crystallized from the solution in substantially pure form at preferably its rate of formation and under conditions adapted for the purpose to maintain a preferred concentration of the solution in respect of alkali-metal ferrocyanide.

In the scrubbing step the said absorption of cyanogen compounds, as shown by the first of the above equations, produces above the scrubbing medium leaving the bottom of the absorber a substantial hydrogen-cyanide vapor pressure unless quite high concentration of alkali-carbonates is carried therein. Inasmuch as the conversion of the volatile, absorbed cyanide to alkali-metal ferrocyanide, shown by the second of the above equations, proceeds slowly in consequence of the relatively sluggish activity of particles of the iron-compound suspension, the immediate return of scrubbing medium to the contact of cyanogen-freed effluent gas would render absorption inefficient. The above-mentioned high concentrations of alkali carbonates complicate crystallization, in a cyclic process, of the formed alkali-metal ferrocyanide free of the said carbonates, and the like. These circumstances are easily avoided by simple novel means forming a part of the present improvement.

The invention provides in the scrubbing medium a concentration of the alkalinity-producing compound that is sufficiently low that the formed alkali-metal ferrocyanide is crystallizable substantially free of the said alkalinity-producing compound, and that is sufficiently high that insoluble complex cyanides do not appear in the solution-suspension (i. e., the said scrubbing medium), and that, in addition also makes possible an economic removal of cyanogen from the gas. This alkalinity is maintained at a preferred level, usually by additions of alkali-metal carbonate, and is about thirty grams per liter, expressed as sodium carbonate, as determined by a simple titration with standard acid.

At such above-described alkalinity, the solution-suspension of the process of the present invention has, when leaving the scrubbing step thereof, a relatively high vapor pressure of hydrogen cyanide. This high vapor pressure, which would obviously interfere with highly efficient removal of cyanogen, must be, in the interest of economical operation, reduced to substantially that or less than that of gas leaving the said scrubbing step and is accomplished by the simple novel expedient of providing in the cycle of the process a delay step of empirically predetermined duration by temporarily storing the solution-suspension out of contact with the cyanogen-bearing gas before it is returned to the contact with further quantities of to-be-treated gas.

For the recovery of the alkali-metal ferrocyanide formed in the process, solution-suspension leaving the gas-scrubbing step is continuously decanted and from the resulting clear solution refined, crystalline, alkali-metal ferrocyanide is recovered at a rate substantially equal to its rate of formation in the scrubbing medium by a preferred one of known crystallizing means. The mother liquor removed from said crystals is then returned to the absorption step of the cyclic process.

In practicing the present invention more especially on coke-oven gases and the like having varying contents of ammonia, hydrogen sulphide, carbon dioxide, and oxygen, minor side reactions can take place and their products can accumulate in the scrubbing solution to such extent as to contaminate the recovered alkali-metal ferrocyanide. To eliminate such contaminants, hereinafter-described method and means are provided, thereby facilitating the practice of the process on a wide variety of cyanogen-containing gases and the recovery of the pure salt which is the object of the invention.

In the accompanying drawing forming a part of the specification and showing for the purposes of exemplification a preferred apparatus and method in which the invention may be embodied and practiced but without limiting the claimed invention specifically to such illustrative instance or instances, the single figure is a diagrammatic elevational view, partly in vertical section, of apparatus for treating cyanogen-bearing gases and for the production of water-soluble alkali-metal ferrocyanides therefrom in accordance with the present invention.

In practicing the process of the present invention in the apparatus shown in the drawing, sodium carbonate is preferably used as a source of the alkali-metal of the ferrocyanide product and also of the non-volatile alkalinity of the solution-suspension. The sodium carbonate is dissolved in water in mixing tank 10. Ferrous sulphate, known to the trade as copperas, is dissolved in preferably a lead-lined mixing tank 15. The mixing tanks are preferably of such capacity that a day's supply of solution can be prepared at one time. The sodium carbonate solution is independently withdrawn from tank 10 through pipe line 11 and is forced by pump 12 through feed line 17 to settling tank 20. The copperas solution is separately withdrawn through pipe line 16 and is pumped also by pump 12 through feed line 17 to the said settling tank. Therein the sodium carbonate solution precipitates the iron of the copperas as ferrous carbonate that thereafter settles to the inverted-cone-like bottom of the tank, making readily decantable clear sodium sulphate solution. Vertically arranged in respect of each other on the outside of tank 20 are decanting valves 21 that can be opened to drain the supernatant clear solution, through decanter drain line 22. After the said supernatant sulphate solution has been decanted from the ferrous carbonate slurry whereby more than about 90 per cent of the so-formed sodium sulphate is eliminated from the scrubbing liquor, additional sodium carbonate solution that is prepared, as is heretofore described, in mixing tank 10 is pumped in like manner to settling tank 20 and is mixed therein with its residual contents to furnish alkalinity to the scrubbing liquor and available sodium ions for reaction with the cyanogen compounds. This solution-suspension in the said tank is protected from the oxidizing effects of the air by being kept under an inert atmosphere of coke-oven gas that has displaced the air in said tank 20 and that is vented to the main gas-stream through vent line 23.

The slurry of suspended ferrous carbonate in the alkaline solution is drawn from settling tank 20 through drain line 24 and is flowed by pump 25 through pipe lines 26, 27 and 28, to feed tank 30 wherein this prepared reagent is stored under an inert atmosphere also of coke-oven gas. Feed tank 30 is vented to the gas stream by the connection of pipe line 31 with the aforementioned vent line 23. The solution-suspension within the feed tank 30 is continually agitated and prevented from settling by its pumped circulation through the pipe lines 32, 26, 27, and 28, in the direction as indicated by the arrows in the drawing.

Solution-suspension is continuously fed, at the rate of consumption of its reactants in the system (at the same time maintaining an excess of iron compound in the system) through feed line 33 by adjustment of a valve therein and by means of pump 34 into a decanter-and-time-delay section 35 at the base of gas scrubber 40 wherein the freshly added solution-suspension makes contact with circulating solution-suspension and is warmed to substantially the temperature of the latter. The decanter-and-time-delay section 35 is separated from the gas-scrubber section of the tower by angularly disposed covering partitions 36 and 39. Vertically arranged beneath the partition 36 are baffles 37 that are disposed in such a manner that all liquid entering the time-delay compartment 35a of the said section 35 must travel a horizontal path of predetermined length, as indicated by the arrows of the drawing, before leaving the said compartment. In the bottom of each baffle compartment is a solution agitator, of which in the drawing only the propellers 38 are diagrammatically shown, each said agitator being employed to promote thorough mixing of the solution-suspension and to prevent settling of solids therefrom during its passage through the said compartment. At the left of the said time-delay compartment, as shown in the drawing, and beneath the angularly disposed covering partition 39 is a settling and decanting compartment 35b that is adapted for the continuous admission thereto through horizontally aligned holes 42 in vertical plate 43 of a relatively small volume-flow of cyanogen-bearing solution-suspension and for the decanting of clear solution therefrom for the subsequent crystallization of sodium ferrocyanide from said clear solution. At the bottom of said decanting compartment residual settled sulphide sludge that is formed by reaction of the said suspended ferrous carbonate with hydrogen sulphide of said gas is removed for subsequent extraction of ferrocyanides and for revivification.

That solution-suspension employed for contact with the gas is withdrawn from the decanter-and-time-delay section 35 and is pumped through pipe line 44 and solution warmer 45 by pump 46. The said pump drives the warmed solution-suspension slurry through solution-suspension feed line 47 to the spray headers 48 at the top of the gas scrubber wherein the said slurry is discharged into the gas space thereof. The solution-suspension flows down over contact-hurdles 49 countercurrently to the flow of the gas which enters the tower at the base of the gas-scrubbing section through inlet-gas main 50. Cyanogen of the said gas is absorbed by the said solution-suspension which as it flows downwardly exhibits an increasing hydrogen-cyanide vapor pressure. Simultaneously with said absorption of cyanogen, carbon dioxide of the gas is absorbed until the carbon-dioxide vapor pressure of the solution-suspension comes into equilibrium with the carbon-dioxide partial pressure of the gas. Absorbed cyanide is slowly converted by reaction with iron of the said suspension during the scrubbing step and during the retention of the solution-suspension in the described time-delay compartment, said conversion producing alkali-metal ferrocyanide in the solution and reducing the hydrogen-cyanide vapor pressure thereof. The outlet gas, stripped of most of its cyanogen, leaves the system through gas main 51 in which there is arranged a moisture eliminator 52 for the removal of any of entrained scrubbing solution carried by the gas stream.

A minor portion of clear concentrated sodium ferrocyanide solution that has been previously separated from the bulk of the recycled solution-suspension and has been segregated from the sulphide suspension by a settling of the latter can be withdrawn intermittently or preferably continuously through decanting line 61 and by means of pump 62 is fed in preferred quantities through crystallizer feed line 64 to a vacuum-crystallizer 60, of suitable design, wherein the said solution is cooled under vacuum to below room temperature to promote the crystallization of the sodium ferrocyanide. Although the said clear solutiton is of such high concentration that when it is allowed to cool to room temperature, a preferred yield of sodium ferrocyanide will crystallize therefrom, it has been found highly desirable to employ the vacuum crystallizer 60 in order to obtain a more efficient and rapid crystallization. The so-formed sodium ferrocyanide crystals and the mother liquor saturated therewith are drained from the crystallizer to the centrifuge feed tank 65 where said mother liquor is decanted from said crystals, the liquor being flowed through drain line 63 to mother-liquor tank 80. Wet, crystalline sodium ferrocyanide is periodically drained from the cone-shaped bottom of the said feed tank to a centrifuge 66 wherein the crystals are dried. The mother liquor separated from the crystals by the centrifuge is drained through drain line 69 to the mother-liquor tank 80. The ferrocyanide crystals are discharged from the centrifuge through chute 67 to receiver 68.

At optionally chosen periods and when shown to be desirable by analyses of the solution-suspension, batch treatments can be made for the removal of alkali-metal sulphate which necessarily will accumulate in the said solution-suspension as a result of heretofore described method of preparation of ferrous carbonate whereby a small amount of alkali-metal sulphate is always introduced with fresh solution-suspension, and also for the removal of other adventitiously formed solutes. For such batchwise treatment, settled iron sulphide sludge in a concentrated solution of sodium ferrocyanide is withdrawn from the bottom of the decanter compartment 35b through drain line 71 and is pumped by pump 72 through agitator feed line 74 to an agitator tank 70. Therein the sludge can be treated with lime to remove by precipitation the sulphate ions from solution as calcium sulphate. The limed sludge containing calcium sulphate and carbonate is filtered in plate-and-frame filter 75 from which the filter cake is discharged through chute 76 to receiving tank 77. The soluble ferrocyanide that is contained in the filtrate from filter 75 is drained through pipe line 78 to the said mother liquor tank 80 whence it is returned to the cyclic system.

When the to-be-treated gas contains appreciable quantities of oxygen and hydrogen sulphide, their reaction with the alkaline alkali-metal compound of the solution will ultimately form some alkali-metal thiocyanate therein. Batches of sludge can be periodically treated for the removal of the latter salt without loss of ferrocyanide to the process by addition of copperas to said sludge in agitator tank 70 and the re-solution of the so-formed insoluble ferrocyanide. The added copperas precipitates the alkali-metal ferrocyanide as ferrous ferrocyanide, and this precipitate with the ferrous sulphide of the sludge is thereafter filtered from the solution in the said plate-and-frame filter 75. The filtrate that is obtained from this latter treatment and containing sulphate and thiocyanate salts is discarded through drain line 82. The filter cake containing the ferrous ferrocyanide and ferrous sulphide is delivered to cake-treating tank 81 wherein the said cake is treated with alkali to dissolve the ferrous ferrocyanide precipitate thereby reforming alkali-metal ferrocyanide which along with the ferrous sulphide of the sludge is thereafter returned to feed tank 30 through feed return line 84 by pump 85 to recover the former and exploit the latter. The said pump 85 can also be of service to return any liquor to the agitator tank 70 and to the plate-and-frame filter through return line 86.

All the collected alkali-metal ferrocyanide mother liquors are returned from mother liquor tank 80 to the bottom of the delay section of the tower by pump 87 in mother liquor return line 88.

The process of the present invention, above-described in connection with the shown apparatus for the purposes of exemplification only, lends itself to the recovery of cyanogen either from coke-oven gas that has been treated for the removal of ammonia or from coke-oven gas that has its original ammonia content, the said cyanogen being removed as water-soluble alkali-metal ferrocyanide and substantially without the production of insoluble cyanides, such as the complex ammonia and iron ferro- and ferricyanides. The alkalinity that is supplied to the scrubbing liquor by the ammonia absorbed from ammonia-bearing gas cannot be a substitute for the soda alkalinity to prevent formation of insoluble cyanides, and therefore the alkalinity contributed by the preferred concentration of nonvolatile alkali-metal carbonate is normally required irrespective of the quantity of ammonia present.

To remove, economically, the cyanogen from gas and to prevent the formation of insoluble cyanides, thereby to avoid loss of absorbed cyanogen as said insoluble cyanides and insure the conversion of substantially all of the absorbed cyanogen to alkali-metal ferrocyanide, the nonvolatile alkalinity (that alkalinity excluding ammonia and ammonia compounds) normally employed is substantially equivalent to thirty grams per liter expressed as sodium carbonate and can be simply determined for control purposes by titration of samples of the circulating solution-suspension with standard acid, using methyl orange as the indicator. Solution-suspension of the above-stated alkalinity will exhibit a titer such that a volume thereof will be about equivalent to an equal volume of three-fifths normal acid. When the cyanogen-bearing gases being treated by the present process are substantially free of, or contain relatively little carbon dioxide, most of the added alkali-metal carbonate until its conversion to the alkali-metal ferrocyanide will always be present in the form of the disodium carbonate. With increase of the carbon dioxide content of the gas, the bicarbonate content of the solution will, as is well known, also increase, and while the bicarbonate is relatively ineffectual in securing the results of the invention, it will nevertheless be included in the above-described titration. It has, however, been determined in the practice that when about half of the carbonate indicated by the said control-titration is actually present as bicarbonate, the efficacy of the results obtained by the process are not importantly altered. When the cyanogen-bearing gas being processed contains so much carbon dioxide that a major portion of the alkalinity indicated by the acid titration is in the form of the bicarbonate the efficiency of cyanogen absorption will, of course, decrease accordingly and it is obvious that the alkalinity as expressed by the described titer must be correspondingly increased by addition of further quantities of alkali-metal carbonate so as to maintain present in the solution an effective concentration of the more reactive disodium carbonate. The course of any change in the carbonate-bicarbonate ratio can be easily followed by, for example, the well-known phenolphthalein-methyl orange titration.

Such increased relative saturation of alkali-metal bicarbonate obtaining in the solution in equilibrium with gas of high carbon-dioxide content can limit the amount of employable cooling of said solution to crystallize the produced alkali-metal ferrocyanide in that it can restrict the range of cooling that can be used for the crystallization of the said ferrocyanide free of the said bicarbonate. In those instances where the range of possible cooling is considerably limited, a simple expedient for obtaining the crystalline alkali-metal ferrocyanide in pure form in substantially full yield at its rate of formation is to maintain a relatively higher relative saturation of the latter salt in the solution-suspension and a greater volume of said solution in the system. In this wise, a high yield of ferrocyanide can be crystallized with only a slight degree of cooling of a more concentrated, greater volume of solution. When the concentration of carbon dioxide in the gas is so high that the concentration of alkali bicarbonate in the solution approaches saturation in the range of crystallization-temperature, this expedient by itself will become ineffective for the purpose. For such circumstance additional provision can be made before the crystallization step for boiling solution to drive off carbon dioxide and thereby to reconvert alkali-metal bicarbonate to the more soluble carbonate. Such boiling can be additionally employed to increase the concentration of the to-be-recovered salt in the solution before it is crystallized by cooling, or alternatively, it can be employed, if preferred, without extensive subsequent cooling to effect crystallization of the salt. In the practice of this alternative method, the above-described expedient of maintaining a higher relative saturation of product in a greater volume of solution will, in an analogous manner, provide a greater range of possible evaporation for the obtaining of bicarbonate-free alkali-metal ferrocyanide.

The concentration of reactants and of produced alkali-metal ferrocyanide in the solution-suspension that is employed in the cyclic method of the invention is maintained substantially constant by the crystallization of ferrocyanide therefrom at substantially its rate of formation and by the circulation of the scrubbing solution-suspension at a temperature preferably slightly higher than the dew-point of water-vapor in the gas to avoid dilution of the solution-suspension with any condensate from the said vapor. The concentration of produced alkali-metal ferrocyanide in the circulated solution-suspension is maintained sufficiently lower than the saturation-concentration of the said salt at the gas scrubbing temperature that there is substantially no precipitation thereof during the scrubbing step. In one example of operation, scrubbing solution washing wet gas at 55° C. had a sodium ferrocyanide concentration of about 180 grams per liter. The lowest concentration of sodium ferrocyanide in the said recirculated solution-suspension is always maintained at least sufficiently higher than the saturation-concentration thereof at the preferred temperature of its crystallization step that it can be removed from the scrubbing solution at a rate substantially equivalent to its rate of formation therein and substantially free of alkali carbonates or other therewith associated compounds. As is hereinbefore described, the present invention provides delay means, embodied in the delay section 35 of the drawing, wherein circulated solution-suspension having left the scrubbing step is retained for a predetermined period before being returned thereto. During such period the scrubbing medium is agitated while out of contact with gas to promote the availability of the iron compound suspension to fix absorbed cyanide and reduce its vapor pressure. The agitation proceeds continuously and solution-suspension is continuously returned to the scrubber after the hydrogen-cyanide vapor pressure of the former is at most less than the partial pressure of the gas leaving the scrubber. The reduction of the vapor pressure can be augmented by the addition of fresh solution-suspension constitutents at this point. The delay step of the invention provides a high scrubbing efficiency in that it makes possible the economic recovery of cyanogen from the gas with a relatively low volume of solution-suspension and a weak non-volatile alkalinity thereof whereas the suppression of the said vapor pressure would otherwise require high solution volumes and a stronger alkalinity. The weak alkalinity possible to be maintained in turn simplifies crystallization of alkali-metal ferrocyanide free of alkali-metal bicarbonate.

It is interesting here to note a discovery that is of importance in respect to the accumulation of contaminants in the solution-suspension employed in the herein-described method. A critical oxygen content of the gas was found to exist (at about 0.5 per cent of the gas as oxygen) below which no sodium thiocyanate was formed in the said solution-suspension. Although, in the treatment of gases where it is not desirable or possible to maintain the oxygen content of same at this low level, means heretofore described for the removal of the said thiocyanate is provided, it is in many cases possible to restrict the oxygen content of coke-oven gases and the like to a content below the said figure and thereby entirely avoid formation of this contaminant.

The invention as hereinbefore set forth is embodied in particular form and manner but may be variously embodied within the scope of the claims hereinafter made.

We claim:

1. A continuous cyclic process for the removal of cyanogen compounds from coke-oven gas, and the like, and for the conversion of the same, without substantial production of insoluble cyanides, to refined alkali-metal ferrocyanide, said process comprising: counter-current scrubbing said gas, at a temperature sufficiently elevated to prevent substantial aqueous condensation therefrom, with a compound of iron in suspension in aqueous solution of concentrated alkali-metal ferrocyanide having also a concentration of non-volatile alkaline compound such that a volume of said solution is made substantiially neutral by an equal volume of three-fifths normal acid; during said scrubbing step, absorbing said cyanogen compounds in the solution-suspension and allowing the same to react with said solution-suspension reactants to form additional alkali-metal ferrocyanide; continuously removing solution-suspension from said scrubbing step while its vapor pressure of absorbed hydrogen cyanide is greater than that in scrubbed gas effluent from said scrubbing step; continuously agitating solution-suspension from the gas-scrubbing step for a period of time to promote the formation of alkali-metal ferrocyanide from said absorbed but unconverted cyanide and thereby reducing the solution's vapor pressure of the latter until it is at most less than the partial pressure of hydrogen cyanide in said effluent gas, continuously returning so-removed and so-treated solution back into scrubbing contact with gas where the gas issues from said scrubbing step; flowing a part of the solution-suspension from the gas scrubbing step into means for separating residual suspension of said iron compound therefrom and segregating therein substantially suspension-free solution from the mixture therein; flowing so-separated solution to a crystallization step and continuously crystallizing from the solution therein refined alkali-metal ferrocyanide at a rate substantially equal to its rate of formation in the scrubbing step and at a temperature which is at least higher than that at which any other scrubbing-solution constituent will crystallize; and returning residual solution from said crystallization step to said scrubbing step.

2. A continuous cyclic process for the removal of cyanogen compounds from coke-oven gas, and the like, and for conversion of the same, without substantial production of insoluble cyanides, to refined alkali-metal ferrocyanide, said process comprising: counter-current scrubbing said gas at a temperature sufficiently elevated to prevent substantial aqueous condensation therefrom, with a compound of iron in suspension in aqueous solution of concentrated alkali-metal ferrocyanide having, in respect of another alkali-metal compound and exclusive of ammonia and compounds thereof, an alkalinity titer that is at least about three-fifths in its normality; during said scrubbing step absorbing said cyanogen compounds in the solution-suspension and allowing the same to react with said solution-suspension reactants to form additional alkali-metal ferrocyanide; continuously removing solution-suspension from said scrubbing step while its vapor pressure of absorbed hydrogen cyanide is greater than that in scrubbed gas effluent from said scrubbing step; continuously recycling the solution-suspension so removed from the scrubbing step back into the same; delaying the return of the so recycled solution-suspension back to the scrubbing step until its said vapor pressure has been reduced by the reaction forming ferrocyanide to at most less than the partial pressure of hydrogen cyanide in said effluent gas; maintaining the alkali-metal ferrocyanide concentration of the solution-suspension for the gas scrubbing step substantially constant by flowing part of the solution-suspension removed from the gas scrubbing step into means for separating residual suspension of said iron compound therefrom, segregating therein substantially suspension-free solution from the mixture, flowing so-separated solution to a crystallization step, and crystallizing therein alkali-metal ferrocyanide in refined form at substantially its rate of formation in the gas scrubbing step by means including cooling of said solution.

3. In a cyclic process for removing cyanogen compounds from coke-oven gas, and the like, and for fixing said compounds as a non-volatile salt through the agency of reagents contained in a weakly alkaline aqueous medium which produces above the scrubbing solution leaving the gas a substantial hydrogen-cyanide vapor pressure, and at least one of said reagents being in the form of a suspension too sluggishly reactive to effect in a scrubbing step fixation of the simultaneously absorbed cyanogen, the steps of counter-currently bringing said gas into contact in a scrubbing step with weakly alkaline aqueous medium aforesaid; removing said medium from contact with so-treated gas; continuously recycling the so removed aqueous medium, while still containing the cyanogen compounds absorbed by prior contact with gas, back into a subsequent counter-current gas-scrubbing step; delaying the flow of the aqueous medium to the subsequent scrubbing step until cyanogen compounds absorbed by said medium during the prior scrubbing step have been sufficiently fixed by said sluggishly reactive reagents that the vapor pressure of the unreacted cyanogen compounds in said weakly alkaline aqueous medium is at most less than the partial pressure thereof in gas issuing from said subsequent counter-current gas-scrubbing step; and agitating the said weakly alkaline aqueous medium in the period of delay of said delaying step to prevent substantial settling of suspension and to promote its availability to reduce the said vapor pressure of the weakly alkaline aqueous medium.

4. A continuous cyclic process for the recovery of cyanogen compounds from coke-oven gas, and the like as refined alkali-metal ferrocyanide comprising: continuously flowing gas aforesaid, under temperature conditions such as to prevent substantial condensation of water vapor therefrom through a counter-current continuous flow of concentrated aqueous solution of alkali metal ferrocyanide also containing an iron compound in suspension and a non-volatile alkaline compound in solution to absorb cyanogen compounds from the gas forming alkali-metal ferrocyanide therewith; continuously discharging such liquor from contact with the gas while its vapor pressure of cyanogen compounds is substantially higher than the partial pressure of cyanogen compounds in gas issuing from said scrubbing step; continuously separating a part of the so discharged liquor from the remainder as suspension-free liquor; continuously recycling the remainder of the so discharged liquor back into counter-flow contact with gas as aforesaid along with iron compound in suspension and non-volatile alkaline compound for further absorption of cyanogen compounds from gas; delaying the return to the gas of the liquor to be recycled for further absorption of cyanogen compounds from gas for a period of time to effect formation of alkali-metal ferrocyanide from residual absorbed cyanogen compounds absorbed therein that have not as yet reacted to form alkali-metal ferrocyanide and thus reduce the vapor pressure of the liquor to be recycled in respect of cyanogen before it is again recycled into contact with gas as aforesaid; and crystallizing refined alkali-metal ferrocyanide from that part of the so discharged liquor that is separated as suspension-free liquor by cooling the same to a temperature below that of the aforesaid scrubbing step.

5. In a cyclic process for removing cyanogen compounds from coke-oven gas, and the like, and for fixing said compounds as a non-volatile salt through the agency of reagents contained in a weakly alkaline aqueous medium which produces above the scrubbing solution leaving the gas a substantial hydrogen cyanide vapor pressure, and at least one of said reagents being in the form of a suspension too sluggishly reactive to effect in a scrubbing step fixation of the simultaneously absorbed cyanogen, the steps of counter-currently bringing said gas into contact in a scrubbing step with weakly alkaline aqueous medium aforesaid; removing said medium from contact with so-treated gas; continuously recycling the so removed acqueous medium, while still containing the cyanogen compounds absorbed by prior contact with gas, back into a subsequent counter-current gas-scrubbing step; and delaying the flow of the aqueous medium to the subsequent scrubbing step until cyanogen compounds absorbed by said medium during the prior scrubbing step have been sufficiently fixed by said sluggishly reactive reagents that the vapor pressure of the unreacted cyanogen compounds in said weakly alkaline aqueous medium is at most less than the partial pressure thereof in gas issuing from said subsequent counter-current gas-scrubbing step.

HERBERT ARTHUR GOLLMAR.
HOWARD JACKSON MEREDITH.